(12) United States Patent
Strickland et al.

(10) Patent No.: US 8,714,758 B2
(45) Date of Patent: May 6, 2014

(54) LIGHT TRAPS AND PANELS FOR LIGHT TRAPS

(75) Inventors: Thomas Randall Strickland, Franklinville, NC (US); Cynthia R. Strickland, Franklinville, NC (US)

(73) Assignee: Red Truck Supply, Inc., Franklinville, NC (US)

( * ) Notice: Subject to any disclaimer, the term of this patent is extended or adjusted under 35 U.S.C. 154(b) by 152 days.

(21) Appl. No.: 13/290,387

(22) Filed: Nov. 7, 2011

(65) Prior Publication Data

US 2012/0113520 A1    May 10, 2012

Related U.S. Application Data

(60) Provisional application No. 61/411,621, filed on Nov. 9, 2010.

(51) Int. Cl.
*G02B 5/00* (2006.01)
*E06B 7/08* (2006.01)

(52) U.S. Cl.
CPC .... *G02B 5/00* (2013.01); *E06B 7/08* (2013.01)
USPC .......................................... 359/613; 454/277

(58) Field of Classification Search
CPC ............. E06B 7/00–7/285; E06B 9/24–9/388; G02B 5/00–5/0294

USPC .......... 359/596, 601, 613–614; 454/196–226, 454/905; 55/440; 160/34

See application file for complete search history.

(56) References Cited

U.S. PATENT DOCUMENTS

| | | | | | |
|---|---|---|---|---|---|
| 3,285,156 | A | * | 11/1966 | Bohanon | 454/277 |
| 3,628,442 | A | * | 12/1971 | Nijhuis | 454/277 |
| 5,238,451 | A |   | 8/1993 | Wulf et al. | 454/282 |
| 5,601,485 | A | * | 2/1997 | Gigola | 454/277 |
| 6,367,937 | B2 | * | 4/2002 | Koster | 359/613 |
| 2006/0080890 | A1 | * | 4/2006 | Nowak et al. | 44/560 |

OTHER PUBLICATIONS

Value Tronics International, Inc.; InternationalLights, Inc. I1-170 Research Radiometer information retrieved from the internet Feb. 16, 2010.

* cited by examiner

*Primary Examiner* — Stephone B Allen
*Assistant Examiner* — Jeffrey Madonna
(74) *Attorney, Agent, or Firm* — MacCord Mason PLLC

(57) ABSTRACT

Light traps, and panels for light traps, are shown and described. In one example, a trap comprises a plurality of panels defining waveforms for at least a portion. The waveforms may be spaced a distance D apart to define a plurality of non-linear air-passages for allowing an airflow (AF) into or out of the poultry house at a velocity (V). The waveforms may include a plurality of light deflective walls (LDWs) for increasing the light reduction factor (RFL).

18 Claims, 5 Drawing Sheets

LIGHT TRAPS AND PANELS FOR LIGHT TRAPS

PRIORITY

This application claims priority to U.S. Application No. 61/411,621 filed 9 Nov. 2011.

FIELD

The current disclosure relates generally to poultry houses, and more particularly to light traps for poultry houses, the traps having increased light reduction.

BACKGROUND

Light traps, e.g. those for poultry houses, are known in the art. In general functional terms, light traps block natural light, while allowing air to flow through. As such, they can be used in combination with artificial lights to create an artificial diurnal cycle inside a structure. In poultry houses, an artificial diurnal cycle may be important for a variety of reasons, including for example, the induction of egg-production in breeding hens. Some poultry farmers may also use diurnal cycles to regulate behavior or physiology in birds, e.g., in broilers for example.

As noted, light traps are constructed to allow airflow though the trap. The flow of air through the trap and into the poultry house is important for a variety of reasons, including, inter alia, the health and fitness of the birds. For example, air flow decreases litter moisture thereby minimizing conditions suitable for pathogen establishment or multiplication. Proper airflow may also be important for regulating or maintaining a uniform temperature in the house, or allowing fresh air to circulate on ground level, etc.

Applicant believes that existing light traps require users to compromise either resistance to light transmission or resistance to airflow. FIG. 1, for example, illustrates a known light trap 2, which provides satisfactory resistance to light transmission at the price of increased resistance to airflow. Light trap 2 includes a plurality of panels 4, each defining a plurality of right angles 4a. Right angles 4a reduce light transmission from an outside 6a to an inside 6b, and create a resistance to airflow 10.

It is to at least one or more of these or additional problems that the current disclosure is directed.

SUMMARY

By way of brief summary, the current disclosure is directed to light traps, e.g., light traps for poultry houses, having light deflective walls (LDWs) positioned on panels of the trap. The current disclosure is also directed to panels for light traps, wherein the panels include LDWs. Using LDWs, applicant has discovered that resistance to light transmission can be increased.

The above summary was intended to summarize certain examples of the present disclosure. Systems and panels will be set forth in more detail, along with examples demonstrating efficacy, in the figures and detailed description below.

DETAILED DESCRIPTION OF VARIOUS EMBODIMENT EXAMPLES

Figure 2:
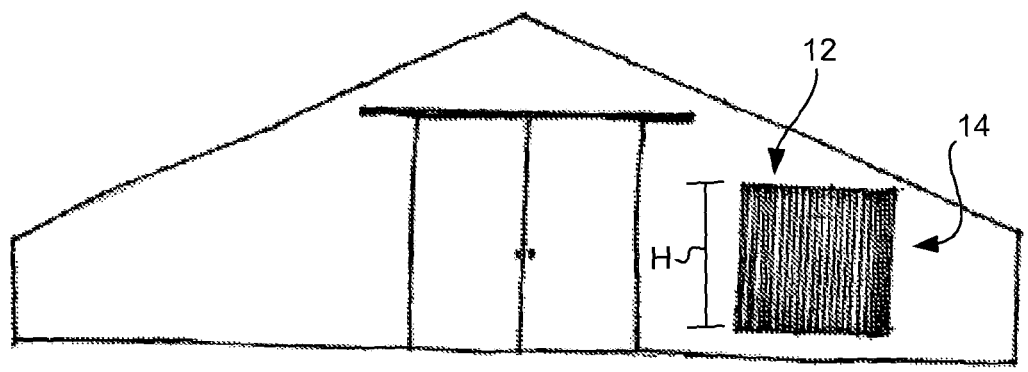
FIG. 2 shows a front view of light trap positioned within a structure.
Figure 3:
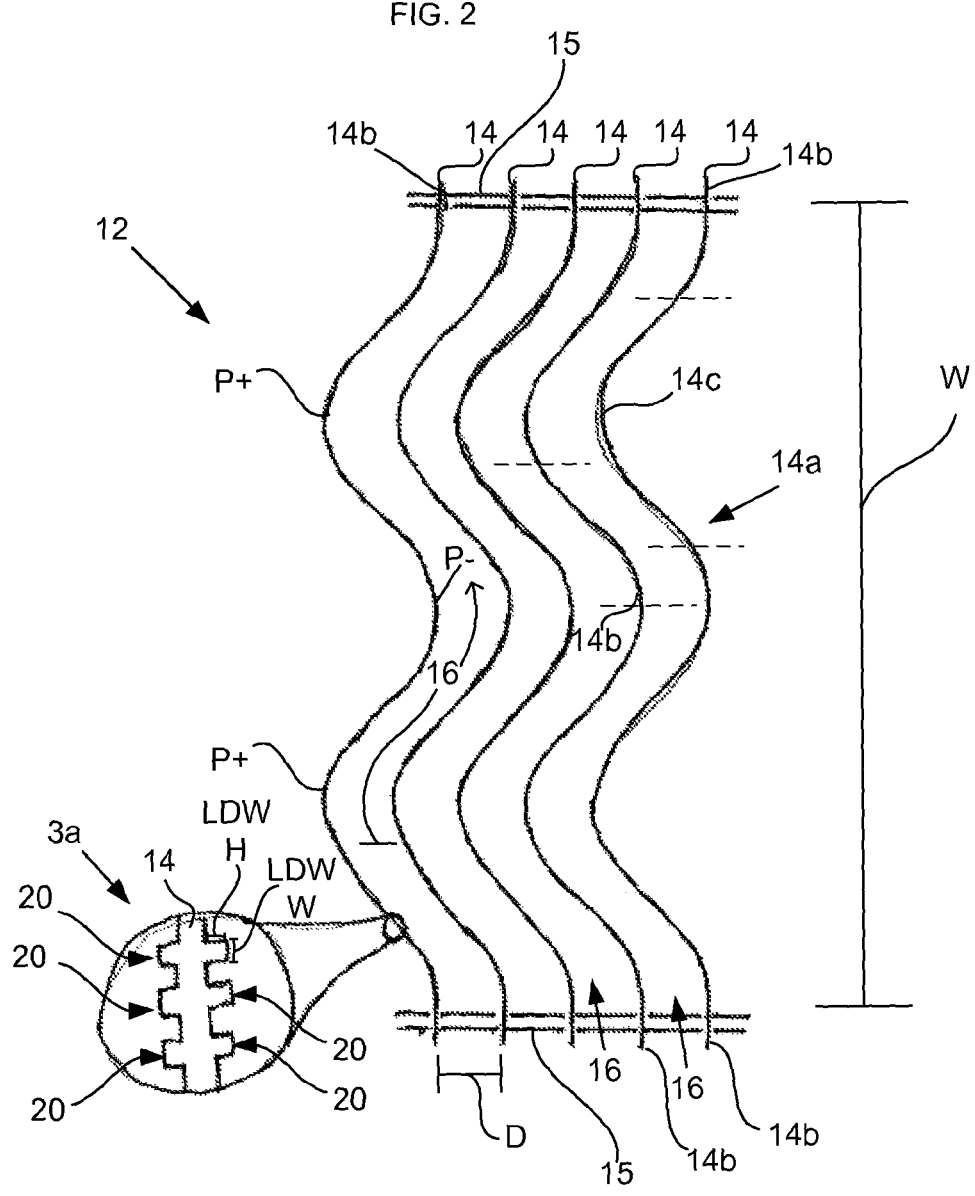
FIG. 3 shows one example of a cut-away view of a light trap as disclosed herein.
Figure 4:
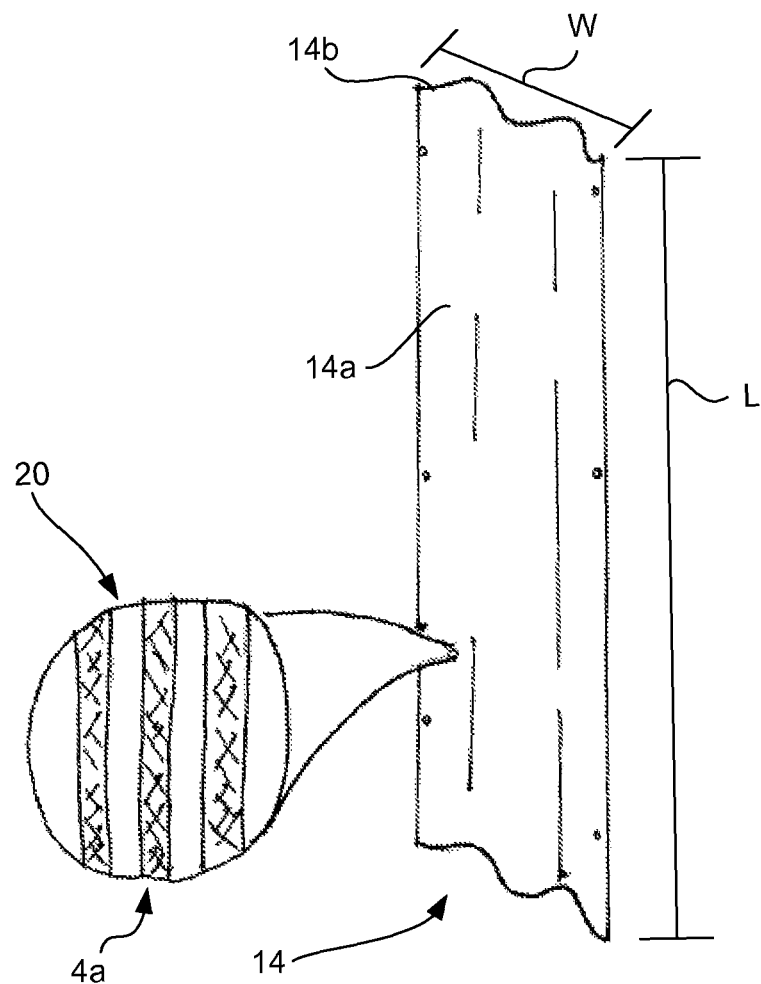
FIG. 4 shows a perspective view of one example of a panel for a light trap as disclosed herein.

FIG. 2 shows a front view of light trap 12, which is one example of a light trap as disclosed herein, positioned in a structure, e.g. a poultry house. FIG. 3 shows a cut-away view of light trap 12 including panels 14 and housing 15. FIG. 4 shows an isolated panel 14, which may be considered one of the plurality of panels of trap 12.

Figure 5:
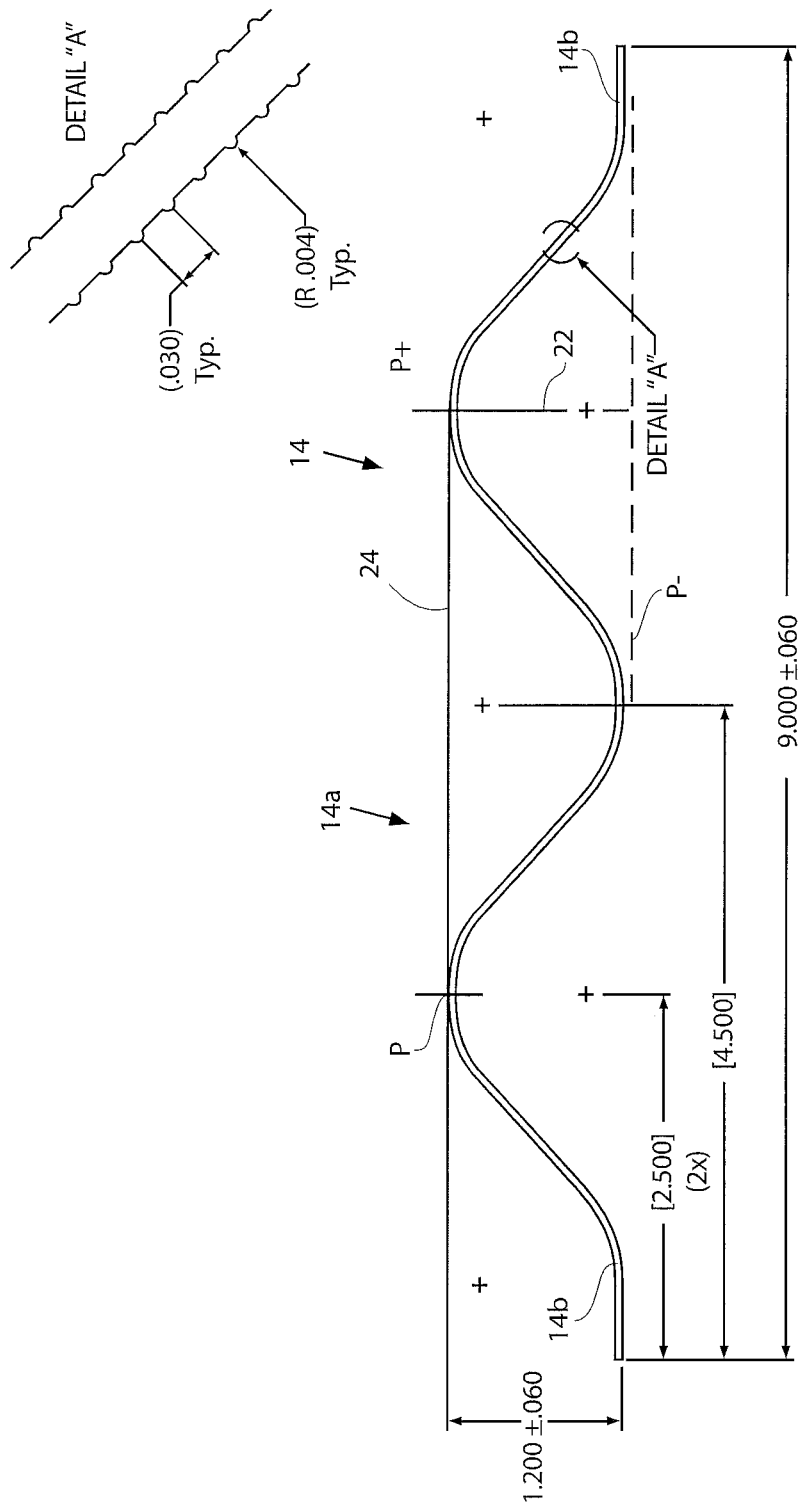
FIGS. 5 and 6 show manufacturing specifications for an example of a panel as disclosed herein.
Figure 6:
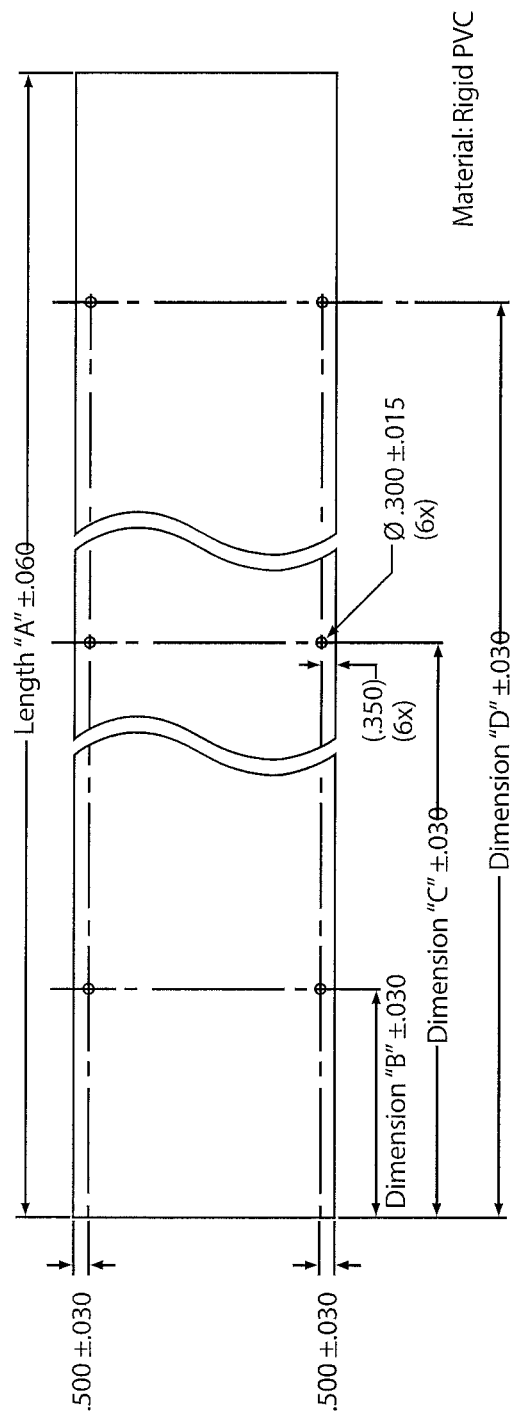

FIGS. 5 and 6 show various manufacturing specifications and views of a panel example, which may be considered similar to panel 14. Similar reference numbers will be used to refer to similar parts shown in the various figures. It should be clear however from the description below that trap 12 is representative of a variety of light trap examples, variations of which are described below.

In this example, trap 12 includes a plurality of panels 14. Each panel 14 is described as having a width W and a length L. Panels 14 define a waveform 14a for at least a portion. As seen, waveforms portions 14a travel in the width direction of the panel. Waveform portions include a plurality of peaks (P), including at least one positive peak and at least one negative peak. Positive and negative are used to indicate relative peak direction. In this example, each panel 14 may be considered to have two positive peaks (P+) and one negative peak (P−) for reference only.

Panels may be completely waveform, or may have other non-waveform portions, e.g., interface edges 14b, which may be straight for example. Straight portions, e.g. 14b, may be used for mounting purposes, etc. Non-waveform portions may also be located in other locations between the edges. Trap examples including a plurality of panels defining a waveform for at least a portion in addition to at least one panel not defining a waveform, are still considered to fall within the scope of the disclosure.

A variety of different waveforms may be used for traps disclosed herein. Referring to FIG. 5, for example, peak-to-peak amplitude 22 can vary. For example, peak-to-peak amplitude may be in the range of about 0.5 to about 3 inches, in the range of about 0.5 to about 2 inches, and in the range of about 0.8 to about 1.4 inches. In the example shown peak-to-peak amplitude is about 1.2 inches. Somewhat similarly, wavelength 24 may also vary. For example, wavelength 24 may be in the range of about 2 to about 8 inches, in the range of about 3 to about 6 inches, and in the range of about 4 to about 5 inches. In the example shown, wavelength 24 is about 4.5 inches. Further, the shapes of the waves themselves may vary in some examples. In the example shown, the wave shape is sinusoidal, but other examples may include other shapes, e.g., sawtooth, etc.

Referring back primarily to FIG. 3, in terms of trap construction, panels 14 are positioned are spaced a distance D apart such that their waveform portions define a plurality of non-linear air-passages 16 for allowing an airflow (AF) into or out of the poultry house at a velocity (V). As used herein, non-linear is intended to mean that, for at least one air passage, a straight line cannot be drawn from an air trap entrance to an air trap exit. The distance D between panels can vary from trap to trap and within a trap, base on, for example, peak-to-peak amplitude, with greater amplitudes allowing for greater D. In some examples, D may be in the range of about 0.5" to about 2" from the center of one panel to the center of an adjacent panel. In many examples, D will be about 0.75" from the center of one panel to the center of the next panel. The resultant air-passages have a resistance to airflow (RAF) and a light reduction factor (RFL). In some examples, D may be correlated with a desired RFL, for example, D may be greater if a lower RFL is acceptable. Spacing between panels may be achieved, for example, by a housing, e.g. housing 15, having recesses, flanges, slots, etc. for securing an interface edge of the panel. In some examples, panels may be secured directly to the structure, e.g. without a housing, by individually fastening a portion of the panel to the structure. Such examples may also be considered light traps, as used herein.

Panels 14, e.g. waveform portions of panels, have a plurality of light deflective walls (LDWs) 20 as illustrated in cross-sectional enlargement 3a, surface enlargement 4a and detail A of FIG. 5. LDWs are constructed to increase the RFL. LDWs may also be constructed to maintain a comparable RAF relative to a control without LDWs. LDWs shape, height, positioning, concentration, and orientation may vary from example to example.

Regarding shape of the LDW, it may vary. In some examples, the LDWs may be rectangular shaped, e.g. as illustrated in FIG. 3. In other examples, LDWs may be semicircular, e.g. as illustrated in FIG. 5, detail A. Still in other examples, LDWs may have other shapes, e.g., triangular. LDWs may also include a combination of shapes within a panel.

Regarding height, in some examples, LDWs have a height (LDW-H) in the range of about 0.01 mm to about 2 mm, in the range of about 0.05 to about 0.5 mm, and in the range of about 0.1 to about 0.5 mm. In many examples, LDWs will have a height of about 0.1mm. Width may similarly vary from example to example. In many examples, width of the walls (LDH-W) will be similar to height, e.g any of H±2 mm, H±1 mm, H±0.5 mm, H±0.5 mm, and H±0.1 mm.

Regarding positioning, in some examples, LDWs will be positioned on the entire waveform portion and on both sides of the waveform. In other examples, LDWs will be positioned on lesser portions of the waveform. For example, some waveform portions include LDWs positioned on at least one of: at least 25% of a wavelength, at least 50% of a wavelength, at least 75% of a wavelength; and about 100% of the wavelength. Further, in many examples, panels will be positioned such that the LDWs of one panel overlap, at least partially, with the LDWs of an adjacent panel. For example in FIG. 2, at least panel portion 14c contains LDWs and at least adjacent panel portion 14b contains LRW, which overlap with LDWs in portion 14c. Other examples may include more or less overlap.

Regarding orientation, LDWs will typically be oriented non-parallel to the direction of the waveform. For example, LDWs 20 in cross-sectional enlargement 3a and LDWs 20 in surface enlargement 4a are shown perpendicular to the direction of the waveform.

In other examples, the LDWs are oriented perpendicularly (±80°) relative to the direction of the waveform. More typically, the LDWs are oriented perpendicularly (±5°) relative to the direction of the waveform.

Regarding concentration, LDWs may be positioned in a variety of concentrations. For example, LDWs may be positioned at a concentration chosen from at least one of the following ranges: about 5 to about 20 LDWs/cm, about 8 to about 18 LDWs/cm; and about 10 to about 15 LDWs/cm.

In terms of construction, LDWs may be created in a variety of ways. For example, LDWs may be defined by the panel itself, e.g., by extrusion. Somewhat similarly, LDWs may be formed by cutting channels into a preformed panel, thereby creating walls between cuts. Further, LDWs may be attached to panels, e.g., by sonic welding. Still other examples may include other ways of forming.

Using light traps as disclosed herein, RFL may be improved. For example, RFL may be increased by a factor chosen from at least one of: at least 1.2×, at least 1.3×, at least 1.4×, at least 1.5×, at least 1.6×, at least 1.7×, at least 1.8×, at least 1.9×, at least 2.0×, at least 2.1×, at least 2.2×, at least 2.3×, at least 2.4×, at least 2.4×, at least 2.5×, at least 2.6×, at least 2.7×, at least 2.8×, at least 2.9×, and at least 3.0×. Other examples may provide other improvements.

In addition to significant improvements in RFL, many examples will not significantly increase RAF. For example, RFL may be increased without increasing RAF by greater than 0.25 inches H20, or greater than 0.10 inches H20, at a velocity of 600 fpm.

Further, some panels may have an antistatic component, e.g. an additive in the panel itself or a coating applied to the panel, to inhibit particles from bonding to panels. Applicant believes that antistatic component will provide for improved RAF. Examples including antistatic components include traps with panels having LDWs as well as panels without LDWs.

Figure 1:
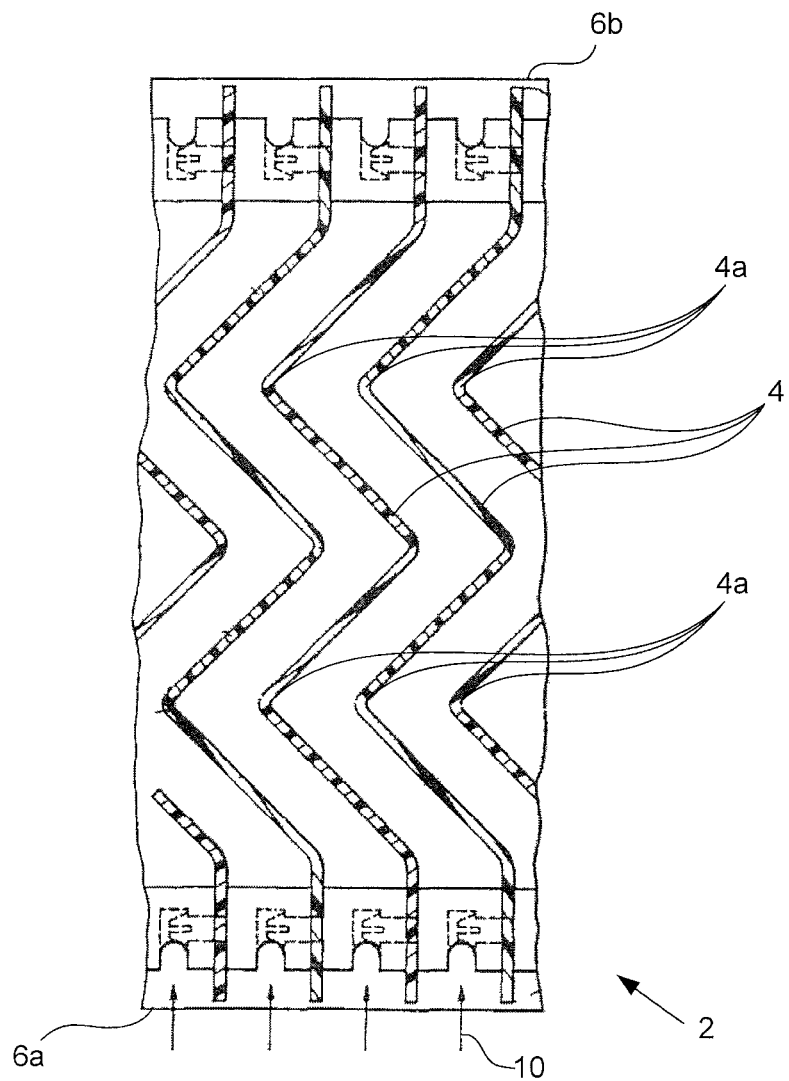
FIG. 1 shows a cut-away view of a known light trap.

Using the teachings contained herein, any of a variety of benefits may be achieved. For example, RFL may be significantly increased without sacrificing RAF. Further, existing traps can be replaced, e.g., similar to the trap in FIG. 1, to provide similar levels of RFL and provide a significant decrease in RAF, thereby providing significant energy savings. Applicant estimates, for example, that the current disclosure can be used to provide an approximately 30% savings in energy without significant sacrifice to RFL in some examples.

The following experimental data is for purposes of illustrating efficacy, not limitation.

EXPERIMENTS

Experimental Trap A ("Etrap A) referenced in the Experiments below refers to a trap having the specifications illustrated in FIGS. 5 and 6 and their accompanying description.

Control Trap referenced in the Experiments below refers to a trap having specifications similar to Etrap with the exception of the LDWs, which are lacking in the control.

Experiment 1

Resistance to Light Transmission

Traps were mounted in a 48"×48" opening in a light blocking wall. Four 1500 W halogen lamps were placed on one side of the trap to simulate direct sunlight. Light measurements were taken outside the trap and inside the trap using an International Light IL-1710 Light meter. The light reduction factor (RFL) was calculated by dividing the outside light intensity by the inside light intensity. A higher RFL indicates a greater resistance to light transmission.

Control Trap Results
1. Light Intensity Outside (fc)
Readings: 5460, 5000, 6350, 6440, 5660, 6110
Mean: 5837
2. Light Intensity Inside (fc)
Readings: 0.00055, 0.00055, 0.00057, 0.00075, 0.00038, 0.00064
Mean: 0.000563

3. Light Reduction Factor (RFL) (Outside/Inside)=10,400,000

ETrapA Results
1. Light Intensity Outside (fc)
Readings: 6000, 5070, 6880, 6860, 6000, 6370
Mean: 6197
2. Light Intensity Inside (fc)
Readings: 0.00030, 0.00039, 0.00011, 0.00023, 0.00014, 0.00024
Mean: 0.000253
3. Light Reduction Factor (RFL) (Outside/Inside)=26,370,000

As seen, the invention example provides greater than 2.5× improvement in light reduction relative to the control.

Experiment 2

Resistance to Airflow

Traps were mounted in a 48"×48" opening in a BESS Lab airflow measurement chamber. Static pressure was measured in inches of water ("in. water") at velocities ranging from approximately 200 feet per minute ("fpm") to approximately 1100 fpm.

At a given face velocity, a lower static pressure indicates less airflow resistance.

| Control Trap | | |
|---|---|---|
| Static Pressure (in. H20) | Airflow (cfm) | Velocity (fpm) |
| 0.010 | 3219 | 201 |
| 0.015 | 3990 | 249 |
| 0.020 | 4469 | 279 |
| 0.040 | 6353 | 397 |
| 0.050 | 7148 | 447 |
| 0.080 | 9179 | 574 |
| 0.100 | 10388 | 649 |
| 0.125 | 11498 | 719 |
| 0.150 | 12707 | 794 |
| 0.200 | 14747 | 922 |
| 0.250 | 16440 | 1028 |
| 0.300 | 18127 | 1133 |

| ETRAP A | | |
|---|---|---|
| Static Pressure (in. H20) | Airflow (cfm) | Velocity (fpm) |
| 0.010 | 3395 | 212 |
| 0.015 | 4098 | 256 |
| 0.020 | 4514 | 282 |
| 0.040 | 6466 | 404 |
| 0.050 | 7275 | 455 |
| 0.080 | 9271 | 579 |
| 0.100 | 10371 | 648 |
| 0.120 | 11420 | 714 |
| 0.150 | 12785 | 799 |
| 0.200 | 14788 | 924 |
| 0.250 | 16432 | 1027 |
| 0.300 | 17977 | 1124 |

As seen, the invention example provides virtually identical resistance to airflow patterns.

Numerous characteristics and advantages have been set forth in the foregoing description, together with details of structure and function. The disclosure, however, is illustrative only, and changes may be made in detail, especially in matters of shape, size, and arrangement of parts, within the principle of the invention, to the full extent indicated by the broad general meaning of the terms in which the general structural examples below are expressed.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein, and every number between the end points. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10, as well as all ranges beginning and ending within the end points, e.g. 2 to 9, 3 to 8, 3 to 9, 4 to 7, and finally to each number 1, 2, 3, 4, 5, 6, 7, 8, 9 and 10 contained within the range. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

What is claimed is:

1. A light trap for a poultry house, the trap comprising:
a plurality of panels having a length and a width, wherein each of the panels defines a waveform for at least a portion, the waveform extending in the width direction of the panel,
wherein the plurality of panels are spaced a distance D apart such that their waveform portions define a plurality of non-linear air-passages for allowing an airflow (AF) into or out of the poultry house at a velocity (V),
wherein the air-passages have a resistance to airflow (RAF) and a light reduction factor (RFL),
wherein each of the waveform portions has a plurality of light deflective walls (LDWs) oriented non-parallel to the direction of the waveform, and wherein the LDWs protrude outward from the panel and each LDW has at least two surface areas substantially perpendicular to the panel adapted to block light from advancing beyond said LDW.

2. The trap of claim 1, wherein the waveform portions include at least three peaks with at least one of the three peaks being a negative peak.

3. The trap of claim 1, wherein the waveform portions include waves having a peak-to-peak amplitude chosen from at least one of about 0.5 to about 3 inches, about 0.5 to about 2 inches, and about 0.8 to about 1.4 inches.

4. The trap of claim 1, wherein the waveform portions have a distance between successive peaks chosen from at least one of about 2 to about 8 inches, about 3 to about 6 inches, and about 4 to about 5 inches.

5. The trap of claim 4, wherein the waveform portions include LDWs positioned on at least one of: at least 25% of a wavelength, at least 50% of a wavelength, at least 75% of a wavelength; and about 100% of the wavelength.

6. The trap of claim 5, wherein the LDWs are positioned at concentration chosen from at least one of about 5 to about 20 LDWs/cm, about 8 to about 18 LDWs/cm; and about 10 to about 15 LDWs/cm.

7. The trap of claim 1, wherein the waveform portions are sinusoidal.

8. The trap of claim 1, wherein the LDWs have a height chosen from at least one of about 0.01 mm to about 2 mm, about 0.05 to about 0.5 mm, and about 0.1 to about 0.5 mm.

9. The trap of claim 1, wherein the LDWs of one panel overlap, at least partially, with the LDWs of an adjacent panel.

10. The trap of claim 1, wherein AF is chosen from at least one of 2,000 to 30,000 cfm; 3,000 to 25,000 cfm; and 3,000 to 20,000 cfm.

11. The trap of claim 1, wherein V is chosen from at least one of 200 to 20,000 fpm; 300 to 15,000 fpm; and 400 to 12,000 fpm.

12. The trap of claim 1, wherein, at a velocity of 600 fpm, the LDWs increase RFL without increasing RAF by greater than 0.25 inches H20.

13. The trap of claim 12, wherein, at 600 fpm, the LDWs increase RFL, without increasing RAF by greater than 0.10 inches H20.

14. A light trap for a poultry house, the trap comprising:
a plurality of panels having a length and a width, wherein each of the panels defines a waveform for at least a portion,
wherein the waveform of each of the plurality of panel travels in the width direction of the panel,
includes a peak-to-peak amplitude in the range of about 0.5 to about 3 inches,
includes a wavelength having a distance between successive peaks in the range of about 2 to about 8 inches, and
includes a plurality of light deflective walls (LDWs) oriented non-parallel to the direction of the waveform, wherein the LDWs protrude outward from the panel and each LDW has at least two surface areas substantially perpendicular to the panel; and
wherein the plurality of panels are spaced a distance D apart such that their waveform portions define a plurality of non-linear air-passages for allowing an airflow (AF) into or out of the poultry house at a velocity (V), the plurality of passages having a resistance to airflow (RAF) and a light reduction factor (RFL).

15. The trap of claim 14, wherein the plurality of LDWs have a height in the range of about 0.01 mm to about 2 mm,
have a width in the range of about 0.01 mm to about 2 mm,
have a concentration in the range of about 5 to about 20 LDWs/cm, for at least one centimeter,
are oriented perpendicularly (±80°) relative to the direction of the waveform, and
increase RFL by a factor of at least 1.2×.

16. In a poultry house, a panel for positioning within a light trap having a height and a width, the panel comprising:
an interface edge for connecting to at least one of a housing or a building;
a waveform defined by at least a portion of the panel, wherein the waveform
travels in the width direction of the panel,
includes a peak-to-peak amplitude in the range of about 0.5 to about 3 inches,
includes a distance between successive peaks in the range of about 2 to about 8 inches, and
includes a plurality of light deflective walls (LDWs) oriented non-parallel to the direction of the waveform, wherein the LDWs protrude outward from the panel and each LDW has at least two surface areas substantially perpendicular to the panel; and
wherein the panel may be spaced a distance D apart from a second panel to define a non-linear air-passages for allowing an airflow (AF) into or out of a building at a velocity (V), the passage having a resistance to airflow (RAF) and a light reduction factor (RFL).

17. The panel of claim 16, wherein the plurality of LDWs have a height in the range of about 0.01 mm to about 2 mm,
have a width in the range of about 0.01 mm to about 2 mm,
have a concentration in the range of about 5 to about 20 LDWs/cm, for at least one wavelength,
are oriented substantially perpendicularly (±80°) relative to the direction of the waveform, and
increase RFL of the passage by a factor of at least 1.2×.

18. The panel of claim 17, wherein the waveform includes at least two positive peaks and at least one negative peak.

* * * * *

UNITED STATES PATENT AND TRADEMARK OFFICE
CERTIFICATE OF CORRECTION

| | | |
|---|---|---|
| PATENT NO. | : 8,714,758 B2 | Page 1 of 1 |
| APPLICATION NO. | : 13/290387 | |
| DATED | : May 6, 2014 | |
| INVENTOR(S) | : Strickland et al. | |

It is certified that error appears in the above-identified patent and that said Letters Patent is hereby corrected as shown below:

In the Specification

In Column 1, Line 7, "9 Nov 2011" should be --9 Nov 2010--.

In Column 3, Line 37, the second occurrence of "H ± 0.5 mm" should be deleted.

In Column 4, Line 11, the second occurrence of "at least 2.4×" should be deleted.

In the Claims

In Column 7, Line 22, "panel" should be --panels--.

Signed and Sealed this
Sixteenth Day of September, 2014

Michelle K. Lee
*Deputy Director of the United States Patent and Trademark Office*